(12) United States Patent
Nakazeki

(10) Patent No.: US 7,810,616 B2
(45) Date of Patent: Oct. 12, 2010

(54) ELECTRIC DIRECT-ACTING ACTUATOR AND ELECTRIC BRAKE DEVICE

(75) Inventor: Tsugito Nakazeki, Iwata (JP)

(73) Assignee: NTN Corporation, Osaka (JP)

( * ) Notice: Subject to any disclaimer, the term of this patent is extended or adjusted under 35 U.S.C. 154(b) by 577 days.

(21) Appl. No.: 11/795,008

(22) PCT Filed: Jan. 12, 2006

(86) PCT No.: PCT/JP2006/300255

§ 371 (c)(1),
(2), (4) Date: Jul. 10, 2007

(87) PCT Pub. No.: WO2006/075641

PCT Pub. Date: Jul. 20, 2006

(65) Prior Publication Data

US 2008/0110704 A1    May 15, 2008

(30) Foreign Application Priority Data

Jan. 13, 2005   (JP) .............................. 2005-006714

(51) Int. Cl.
*F16D 55/08*   (2006.01)
(52) U.S. Cl. ..................... 188/72.8; 188/72.7; 188/158; 188/162
(58) Field of Classification Search ................ 188/158, 188/162, 72.3, 72.7, 72.8, 196 V; 74/89.23, 74/424.89
See application file for complete search history.

(56) References Cited

U.S. PATENT DOCUMENTS

| 4,615,229 | A | * | 10/1986 | Granbom | ................. 74/424.92 |
|---|---|---|---|---|---|
| 4,811,618 | A | | 3/1989 | Takayama | |
| 4,865,162 | A | * | 9/1989 | Morris et al. | ............... 188/72.8 |
| 5,788,023 | A | | 8/1998 | Schoner et al. | |
| 6,158,558 | A | * | 12/2000 | Bill et al. | ..................... 188/162 |
| 6,230,855 | B1 | * | 5/2001 | Holding | ....................... 188/158 |

(Continued)

FOREIGN PATENT DOCUMENTS

JP   53-56473   5/1978

(Continued)

*Primary Examiner*—Robert A Siconolfi
*Assistant Examiner*—Mariano Sy
(74) *Attorney, Agent, or Firm*—Wenderoth, Lind & Ponack, L.L.P.

(57) ABSTRACT

An electric direct-acting actuator is proposed which can maintain a large power increasing function without mounting a separate speed reducer. A plurality of planetary rollers (7) are disposed between the radially outer surface of a rotor shaft (5) of an electric motor and the radially inner surface of an outer ring member (1) fixed in position around the rotor shaft (5) so as to be rotatable about the rotor shaft (5) and about their own axes when the rotor shaft (5) rotates. A helical rib is defined by a rib member (9) engaged in a helical groove (8) formed in the radially inner surface of the outer ring member (1). The helical rib is engaged in circumferential grooves (10) formed in the radially outer surface of each planetary roller (7) at the same pitch as the turns of the helical rib. Thus, the rotary motion of the rotor shaft (5) is converted to a linear motion of the planetary rollers (7), so that it is possible to ensure a large power increasing function without mounting a separate speed reducer.

6 Claims, 4 Drawing Sheets

U.S. PATENT DOCUMENTS

| | | | |
|---|---|---|---|
| 6,257,377 B1 * | 7/2001 | Schumann | 188/72.8 |
| 6,305,508 B1 * | 10/2001 | Schumann | 188/72.8 |
| 6,325,180 B1 * | 12/2001 | De Vries et al. | 188/72.1 |
| 6,349,801 B1 * | 2/2002 | Koth et al. | 188/72.8 |
| 6,367,592 B1 * | 4/2002 | Kapaan et al. | 188/72.1 |
| 6,367,597 B1 * | 4/2002 | De Vries et al. | 188/196 V |
| 6,554,109 B1 * | 4/2003 | Olschewski et al. | 188/72.8 |

FOREIGN PATENT DOCUMENTS

| | | |
|---|---|---|
| JP | 54-65262 | 5/1979 |
| JP | 63-96359 | 6/1988 |
| JP | 6-327190 | 11/1994 |
| JP | 8-338461 | 12/1996 |
| JP | 2003-343620 | 12/2003 |

* cited by examiner

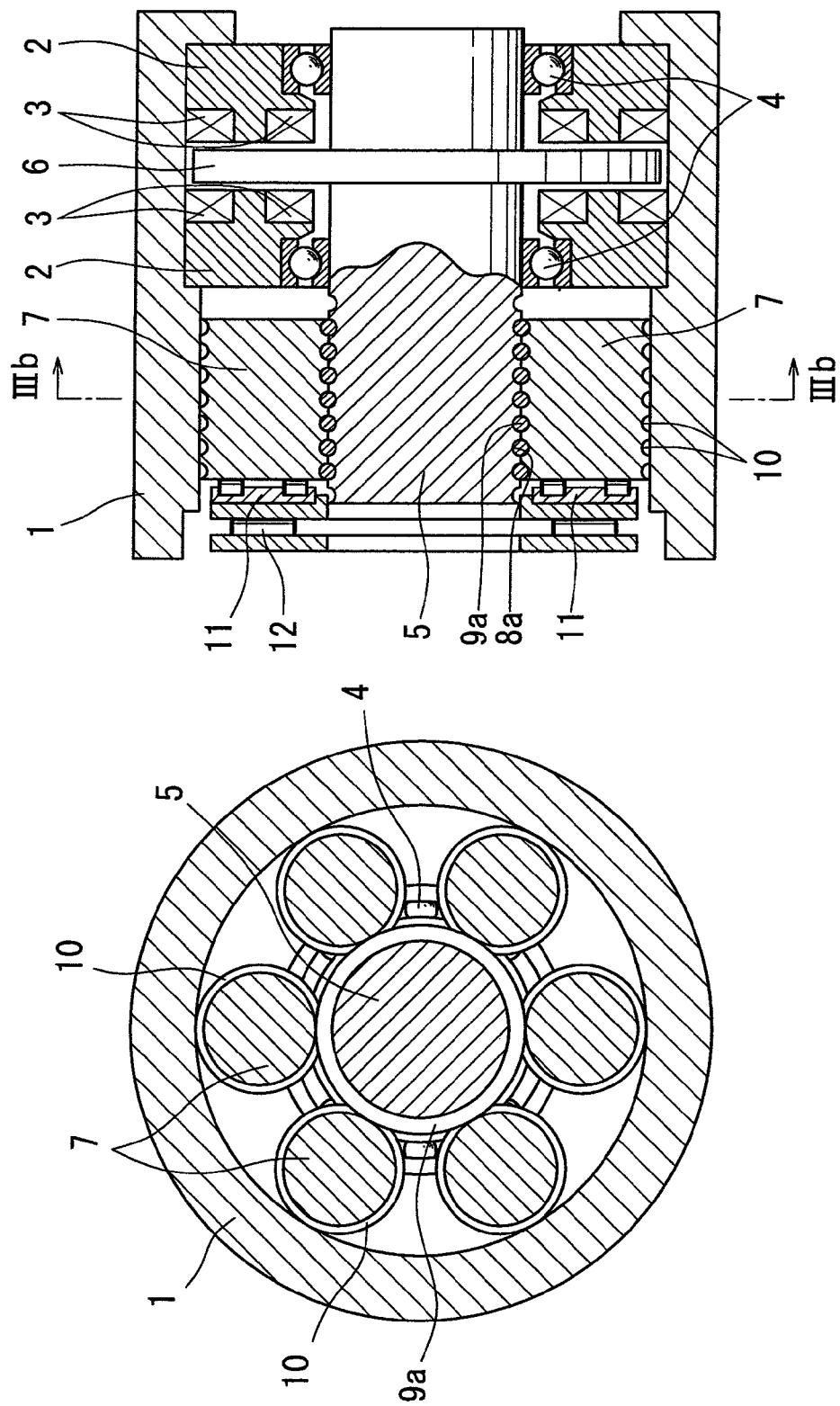

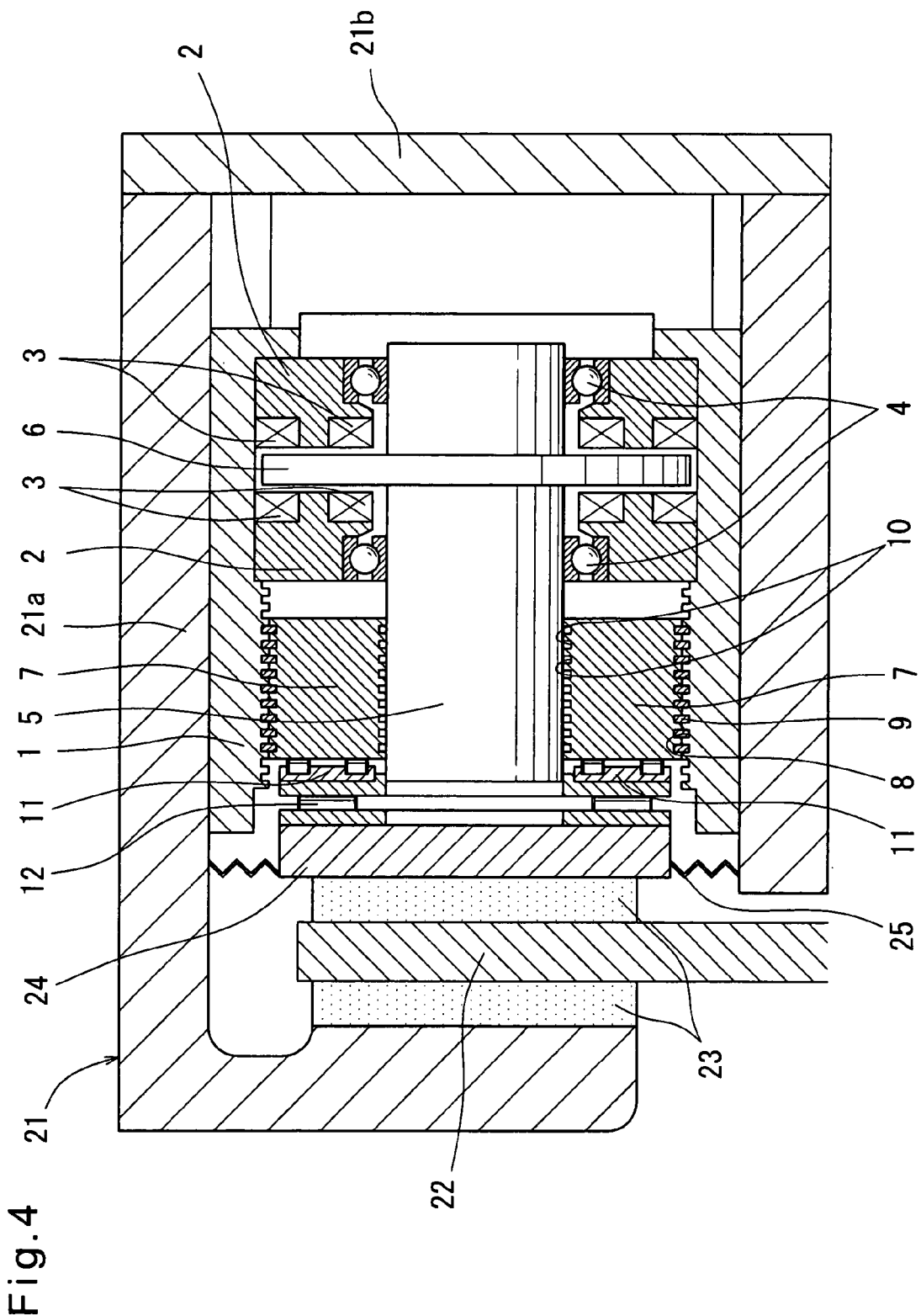

ELECTRIC DIRECT-ACTING ACTUATOR AND ELECTRIC BRAKE DEVICE

BACKGROUND OF THE INVENTION

1. Technical Field

The present invention relates to an electric direct-acting actuator for converting the rotary motion of an electric motor to a linear motion to linearly drive an object to be driven, and an electric brake device which uses an electric direct-acting actuator to press a braking member against a member to be braked.

2. Background Art

Electric direct-acting actuators for converting the rotary motion of an electric motor to a linear motion to linearly drive an object to be driven typically include ball-screw mechanisms or ball-ramp mechanisms for such motion conversion. Also, in order to obtain a large linear driving force with a small-capacity electric motor, such actuators typically include a gear speed reducer such as a planetary gear speed reducer (as disclosed e.g. in JP patent publication 6-327190A (FIGS. 1 and 5)).

On the other hand, although many of today's vehicle brake devices are of the hydraulic type, electric brake devices are gathering attention now because they can perform sophisticated brake control functions that are used in today's vehicles, such as ABS (antilock brake system) without the need for complicated hydraulic circuits, and thus can be designed compactly. In this type of electric brake device, an electric motor is actuated based on a signal indicating that the brake pedal has been depressed, and the braking member is pressed against a member to be braked by means of the above-described type of electric direct-acting actuator, which is mounted in a caliper body (as disclosed e.g. in JP patent publication 2003-343620A (FIG. 1)).

Because such electric brake devices are mounted under springs of a vehicle, it is desired that such brake devices operate stably even if vibrations transmitted from the road surface are applied thereto and can be designed compactly.

SUMMARY OF THE INVENTION

Ball-screw mechanisms and ball-ramp mechanisms used in conventional electric direct-acting actuators as described above have a power increasing function to a certain extent due to their motion converter for converting the rotary motion along threads having a lead or inclined cam surfaces, but cannot achieve such a large power increasing function as required in e.g. electric brake devices. That is, although the power increasing function can be increased by reducing the lead angle of the threads or the inclination angle of the cam surfaces, if the lead angle of the threads of the ball-screw mechanism is reduced, the ball diameter has to be correspondingly reduced, so that the load capacity decreases. If the inclination angle of the cam surfaces of the ball-ramp mechanism is reduced, the stroke of the linear motion will be insufficient.

Thus in such an electric direct-acting actuator using a motion converter as described above, a separate speed reducer as described above is mounted to increase the driving force. By mounting a gear speed reducer such as a planetary gear speed reducer, it becomes difficult to reduce the size of the electric direct-acting actuator. Further, because the gears of the gear speed reducer mesh with each other in small contact areas, if such a gear speed reducer is mounted in an area where it is influenced by vibrations from road surfaces as in the case of an electric brake device, the gears tend to become damaged.

An object of the present invention is to provide an electric direct-acting actuator and an electric brake device which can achieve a large power increasing function without mounting a separate speed reducer.

In order to achieve this object, the present invention provides an electric direct-acting actuator for converting a rotary motion of an electric motor to a linear motion to linearly drive an object to be driven, wherein a plurality of planetary rollers are disposed between a radially outer surface of a rotor shaft of the electric motor and a radially inner surface of an outer ring member fixed in position around the rotor shaft, whereby the planetary rollers are configured to rotate about the rotor shaft while rotating about their own axes when the rotor shaft rotates, a relatively axially moving means is provided between the respective planetary rollers and one of the rotor shaft and the outer ring member for axially and relatively moving the planetary rollers, whereby the rotary motion of the rotor shaft is converted to a linear motion of the planetary rollers.

That is, by providing a plurality of planetary rollers between the radially outer surface of the rotor shaft of the electric motor and the radially inner surface of an outer ring member fixed in position around the rotor shaft, whereby the planetary rollers are configured to rotate about the rotor shaft while rotating about their own axes when the rotor shaft rotates, and by providing a relatively axially moving means between the respective planetary rollers and one of the rotor shaft and the outer ring member for axially and relatively moving the planetary rollers, whereby the rotary motion of the rotor shaft is converted to a linear motion of the planetary rollers, it is possible to obtain a large power increasing function without mounting a separate speed reducer. Also, because the planetary rollers are brought into rolling contact with the rotor shaft and the outer ring member in large areas, even if vibrations are applied thereto, motion can be stably converted and transmitted.

By forming the relatively axially moving means from a helical rib provided on the radially outer surface of the rotor shaft or the radially inner surface of the outer ring member, and circumferential grooves formed in the radially inner surface of each of the planetary rollers, the circumferential grooves being arranged at the same pitch as the turns of the helical rib, the helical rib being engaged in the circumferential grooves, whereby when the planetary rollers rotate about the rotor shaft while rotating about their own axes, the planetary rollers are relatively and axially moved, it is possible to further increase the power increasing function.

With this relatively axially moving means, when the rotor shaft rotates once, the planetary rollers makes a ½ to ⅓ turn about the rotor shaft depending on the diameter ratio between the rotor shaft and the planetary rollers. The lead of the planetary rollers relative to their rotation about the rotor shaft can also be reduced to ⅕ to ¹⁄₁₀ of the lead of ball-screw mechanisms. Thus, compared to ball-screw mechanisms, in which a linear motion equivalent to one lead is obtained per rotation of the threaded shaft or the nut, the relatively axially moving means according to the invention can provide a tenfold or more power increasing function. This eliminates the necessity for a separate speed reducer.

The helical rib may be defined by a rib member engaged in a helical groove formed in the radially outer surface of the rotor shaft or the radially inner surface of the outer ring member. With this arrangement, the helical rib can be formed easily at a low cost. The rib member may have a square, round or any other cross-section according to the sectional shape of the circumferential grooves formed in the planetary rollers.

By transmitting the linear motion of the planetary rollers to the object to be driven through thrust bearings for supporting the rotation of the respective planetary rollers about their own axes and a thrust bearing for supporting the rotation of the planetary rollers about the rotor shaft, it is possible to transmit the linear motion of the planetary rollers, which rotate about their own axes while rotating about the rotor shaft, to the object to be driven without loss.

The present invention also provides a brake device including an electric direct-acting actuator for converting a rotary motion of an electric motor to a linear motion to linearly drive a braking member, thereby pressing the linearly driven braking member against a member to be braked, characterized in that as the electric direct-acting actuator, any of the above-described electric direct-acting actuators is used. With this arrangement, because it is not necessary to mount a separate speed reducer, it is possible to compactly design the brake device while maintaining a large power increasing function, and also improve the durability even if used in an environment where vibrations are applied from the road surface.

For the electric direct-acting actuator according to this invention, because a plurality of planetary rollers are provided between the radially outer surface of the rotor shaft of the electric motor and the radially inner surface of an outer ring member fixed in position around the rotor shaft, whereby the planetary rollers are configured to rotate about the rotor shaft while rotating about their own axes when the rotor shaft rotates, and a relatively axially moving means is provided between the respective planetary rollers and one of the rotor shaft and the outer ring member for axially and relatively moving the planetary rollers, whereby the rotary motion of the rotor shaft is converted to a linear motion of the planetary rollers, it is possible to obtain a large power increasing function without mounting a separate speed reducer. Also, because the planetary rollers are brought into rolling contact with the rotor shaft and the outer ring member in large areas, even if vibrations are applied thereto, motion can be stably converted and transmitted.

By forming the relatively axially moving means from a helical rib provided on the radially outer surface of the rotor shaft or the radially inner surface of the outer ring member, and circumferential grooves formed in the radially outer surface of each of the planetary rollers, the circumferential grooves being arranged at the same pitch as the turns of the helical rib, the helical rib being engaged in the circumferential grooves, whereby when the planetary rollers rotate about the rotor shaft while rotating about their own axes, the planetary rollers are relatively and axially moved, it is possible to further increase the power increasing function.

The helical rib may be defined by a rib member engaged in a helical groove formed in the radially outer surface of the rotor shaft or the radially inner surface of the outer ring member. With this arrangement, the helical rib can be formed easily at a low cost.

By transmitting the linear motion of the planetary rollers to the object to be driven through thrust bearings for supporting the rotation of the respective planetary rollers about their own axes and a thrust bearing for supporting the rotation of the planetary rollers about the rotor shaft, it is possible to transmit the linear motion of the planetary rollers, which rotate about their own axes while rotating about the rotor shaft, to the object to be driven without loss.

Because one of the above-described electric direct-acting actuators is used in the electric brake device according to this invention, it is not necessary to mount a separate speed reducer, so that it is possible to compactly design the brake device while maintaining a large power increasing function, and also improve the durability even if used in an environment where vibrations are applied from the road surface.

BRIEF DESCRIPTION OF THE DRAWINGS

FIG. 3A is a vertically sectional view of an electric direct-acting actuator of a second embodiment, and FIG. 3B is a sectional view taken along line IIIb-IIIb of FIG. 3A.

FIG. 4 is a vertical sectional view of an electric brake device using the electric direct-acting actuator of FIG. 1.

DETAILED DESCRIPTION OF THE INVENTION

Figure 1:
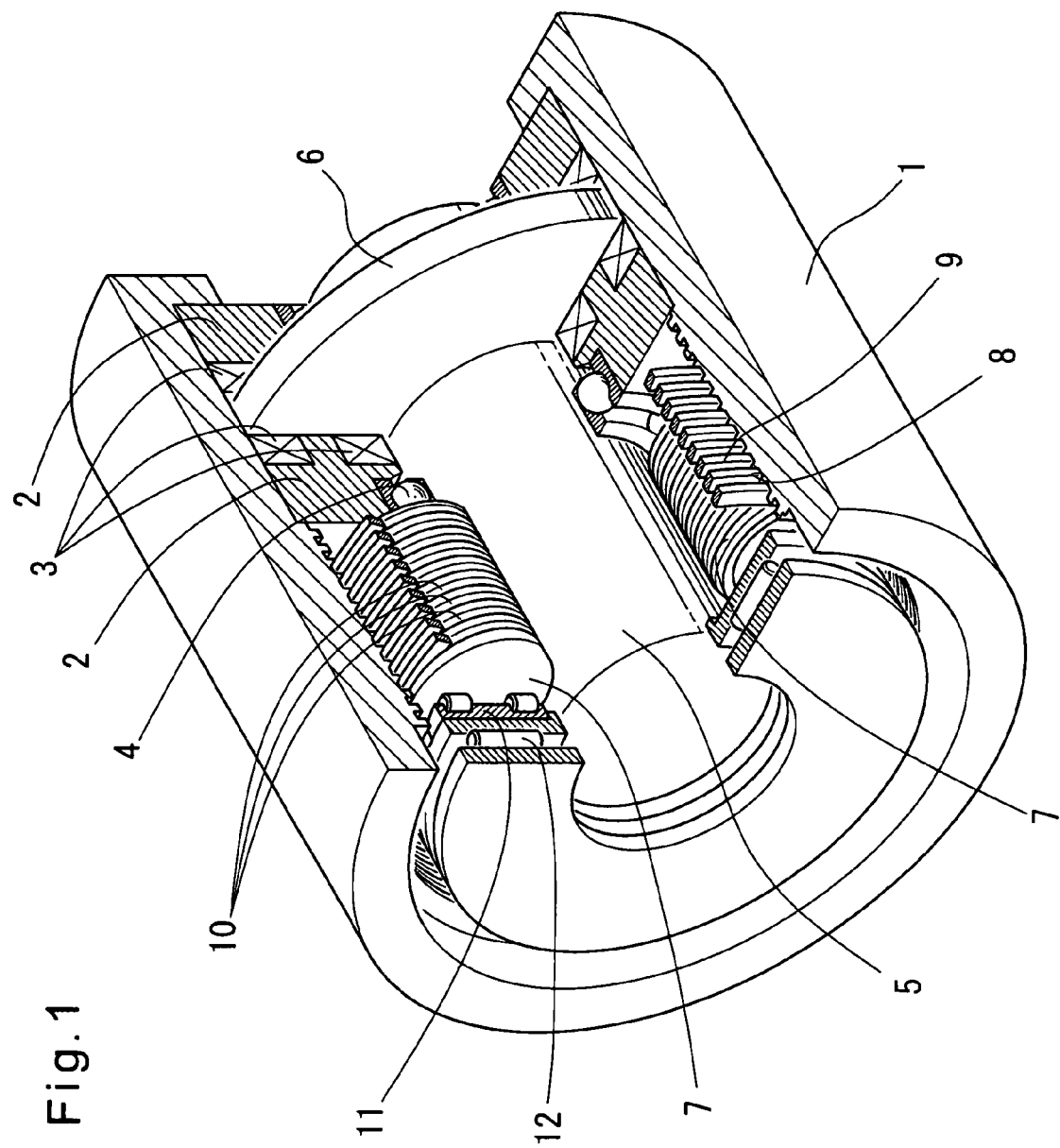
FIG. 1 is a partially cutaway perspective view of an electric direct-acting actuator of a first embodiment.
Figure 2B:
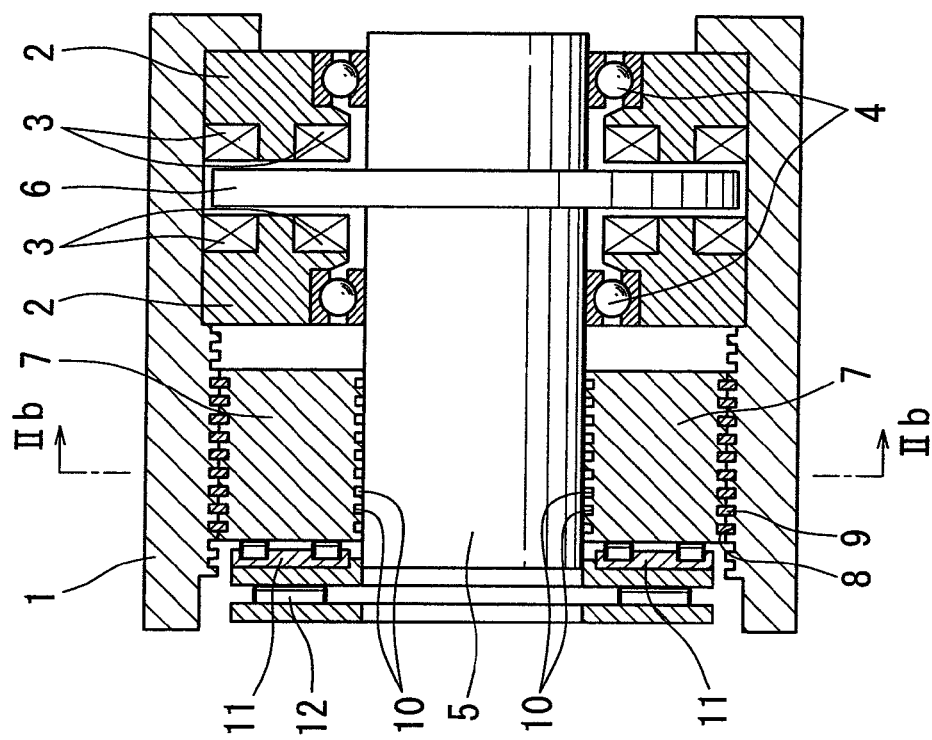
FIG. 2B is a sectional view taken along line IIb-IIb of FIG. 2A.
Figure 2A:
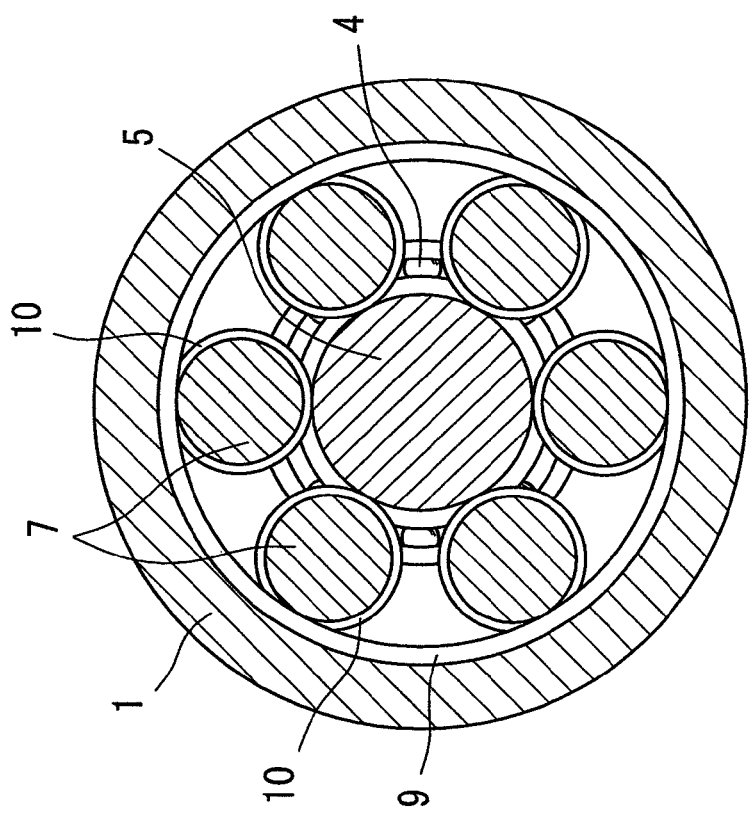
FIG. 2A is a vertical sectional view of FIG. 1.

Now the embodiments of the present invention are described with reference to the drawings. FIGS. 1, 2A and 2B show an electric direct-acting actuator of the first embodiment. This electric direct-acting actuator includes a pair of stator cores 2 received in an outer ring member 1 at one end thereof. Coils 3 of a multipolar electric motor are fixed to the stator cores 2 so as to axially oppose each other. A rotor 6 mounted on a rotor shaft 5 supported by the stator cores 2 through ball bearings 4 rotates between the opposed stators. At the other end of the outer ring member 1, a plurality of planetary rollers 7 are disposed between the radially inner surface of the outer ring member 1 and the radially outer surface of the rotor shaft 5 with a negative clearance. As the rotor shaft 5 rotates, the planetary rollers 7 rotate about the rotor shaft 5 while simultaneously rotating about their own axes. To increase wear resistance, surface hardening treatment is applied to the radially outer surfaces of the planetary rollers 7, and the portions of the radially inner surface of the outer ring member 1 and the radially outer surface of the rotor shaft 5 with which the planetary rollers 7 are brought into rolling contact. These rolling contact surfaces are lubricated with high-lubricity grease.

A helical groove 8 is formed in the radially inner surface of the outer ring member 1 at the other end thereof with which the planetary rollers 7 are brought into rolling contact. A rib member 9 having a square cross-section is engaged in the helical groove 8 to define a helical rib. In the radially outer surface of each planetary roller 7, circumferential grooves 10 are formed having a square cross-section and arranged at the same pitch as the turns of the helical rib. The helical rib is engaged in the grooves 10 of each planetary roller 7. Thus, when the rotor shaft 5 rotates, and the planetary rollers 7 rotate about the rotor shaft 5 while rotating about their own axes, the planetary rollers 7 also move axially in a straight line due to engagement with the helical rib on the outer ring member 1.

Thrust needle roller bearings 11 are provided on the end surfaces of the planetary rollers 7 remote from the rotor 6 to support the rotation of the planetary rollers 7 about their own axes. Another thrust needle bearing 12 is provided on the needle roller bearings 11 on their sides remote from the rollers 7 to support the rotation of the planetary rollers 7 about the rotor shaft 5. Through the thrust needle roller bearings 11 and 12, the linear motion of the planetary rollers 7 is transmitted to an object to be driven (not shown). The thrust needle roller bearings 11 are arranged so as to be coaxial with the respective planetary rollers 7. The thrust needle roller bearing 12 is arranged so as to be coaxial with the rotor shaft 5.

FIGS. 3A and 3B show an electric direct-acting actuator of the second embodiment, which is basically of the same structure as the first embodiment, except that the helical rib is defined by a rib member 9a engaged in a helical groove 8a formed in the radially outer surface of the rotor shaft 5 and having a round cross-section. Thus, in this embodiment, when the rotor shaft 5 rotates, and the planetary rollers 7 rotate about the rotor shaft 5 while rotating about their own axes, the planetary rollers 7 also move axially in a straight line due to engagement with the helical rib on the rotor shaft 5.

FIG. 4 shows an electric brake device including the electric direct-acting actuator of the first embodiment. This electric brake device is a disc brake including a disc rotor 22 as a member to be braked, and brake pads 23 as braking members provided in a caliper body 21 so as to oppose the disc rotor 22. In a cylindrical portion 21a of the caliper body 21, the electric direct-acting actuator is mounted so that the linear motion of the planetary rollers 7 are transmitted to a mounting plate 24 of one of the brake pads 23 near the actuator. The cylindrical portion 21a, in which the electric direct-acting actuator is mounted, has its front end sealed with a boot 25 and its rear end sealed with a lid 21b.

In this embodiment, the electric direct-acting actuator is used in a brake device. But the electric direct-acting actuator according to the present invention may be used for devices other than a brake device.

What is claimed is:

1. An electric direct-acting actuator for converting a rotary motion of an electric motor to a linear motion to linearly drive an object to be driven, wherein a plurality of planetary rollers are disposed between a radially outer surface of a rotor shaft of said electric motor and a radially inner surface of an outer ring member fixed in position around said rotor shaft, whereby said planetary rollers are configured to rotate about said rotor shaft while rotating about their own axes when said rotor shaft rotates, a relatively axially moving means is provided between the respective planetary rollers and one of said rotor shaft and said outer ring member for axially and relatively moving said planetary rollers, whereby the rotary motion of said rotor shaft is converted to a linear motion of said planetary rollers, wherein the linear motion of said planetary rollers is transmitted to said object to be driven through thrust bearings for supporting the rotation of said respective planetary rollers about their own axes and a thrust bearing for supporting the rotation of said planetary rollers about the rotor shaft.

2. The electric direct-acting actuator of claim 1 wherein said relatively axially moving means comprises a helical rib provided on the radially outer surface of said rotor shaft or the radially inner surface of said outer ring member, and circumferential grooves formed in a radially outer surface of each of said planetary rollers, said circumferential grooves being arranged at the same pitch as the turns of said helical rib, said helical rib being engaged in said circumferential grooves, whereby when said planetary rollers rotate about said rotor shaft while rotating about their own axes, said planetary rollers are relatively and axially moved.

3. The electric direct-acting actuator of claim 2 wherein said helical rib is defined by a rib member engaged in a helical groove formed in the radially outer surface of said rotor shaft or the radially inner surface of said outer ring member.

4. A brake device including an electric direct-acting actuator for converting a rotary motion of an electric motor to a linear motion to linearly drive a braking member, thereby pressing the linearly driven braking member against a member to be braked, wherein the electric direct-acting actuator of claim 2 is used as said electric direct-acting actuator.

5. A brake device including an electric direct-acting actuator for converting a rotary motion of an electric motor to a linear motion to linearly drive a braking member, thereby pressing the linearly driven braking member against a member to be braked, wherein the electric direct-acting actuator of claim 3 is used as said electric direct-acting actuator.

6. A brake device including an electric direct-acting actuator for converting a rotary motion of an electric motor to a linear motion to linearly drive a braking member, thereby pressing the linearly driven braking member against a member to be braked, wherein the electric direct-acting actuator of claim 1 is used as said electric direct-acting actuator.

\* \* \* \* \*